United States Patent [19]

Marsh

[11] Patent Number: 5,762,408
[45] Date of Patent: Jun. 9, 1998

[54] DEBRIS STRIPPING APPARATUS

[76] Inventor: Preston L. Marsh, 74 W. Curtis Rd., Hope, Mich. 48628

[21] Appl. No.: 566,716

[22] Filed: Dec. 4, 1995

[51] Int. Cl.⁶ ............................................. B62D 55/088
[52] U.S. Cl. .................................. 305/108; 305/100
[58] Field of Search .............................. 305/11, 12, 13, 305/100, 107, 108, 109

[56] References Cited

U.S. PATENT DOCUMENTS

| | | | |
|---|---|---|---|
| 1,872,120 | 8/1932 | Caskey | 280/855 |
| 2,982,584 | 5/1961 | Uemura | 305/12 |
| 3,924,905 | 12/1975 | Simmons | 305/12 |
| 4,235,479 | 11/1980 | Puglise | 305/12 |
| 4,531,787 | 7/1985 | Hart et al. | 305/12 |
| 4,763,961 | 8/1988 | Parrott | 305/12 |
| 4,818,040 | 4/1989 | Mezzancella | 305/12 |
| 4,830,439 | 5/1989 | Collins et al. | 305/11 |

FOREIGN PATENT DOCUMENTS

| | | | |
|---|---|---|---|
| 328932 | 9/1919 | Germany | 305/11 |

*Primary Examiner*—Russell D. Stormer
*Attorney, Agent, or Firm*—John J. Swartz

[57] ABSTRACT

Apparatus for removing debris from a position between a laterally inner edge of a continuous drive track and a motor vehicle on which the track is mounted including a stripper bar adapted to be mounted laterally adjacent the lateral inner edge and mechanism for mounting the stripper bar on a laterally inner edge portion of the track.

32 Claims, 8 Drawing Sheets

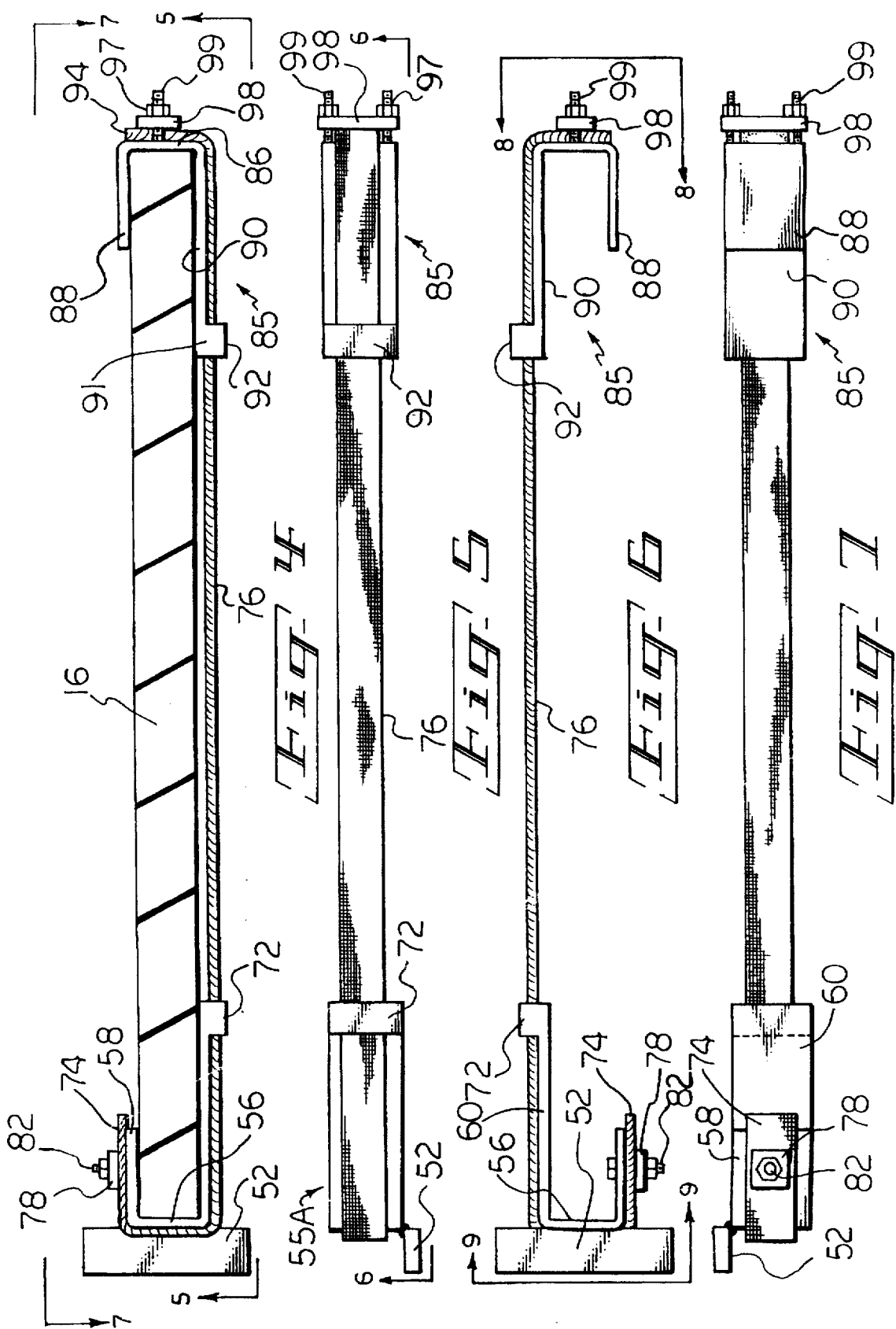

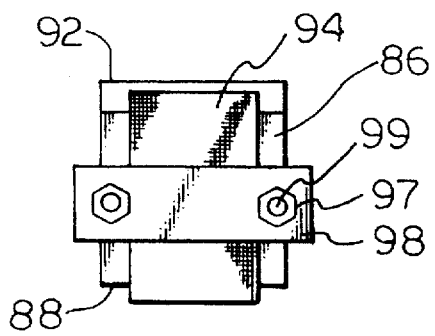
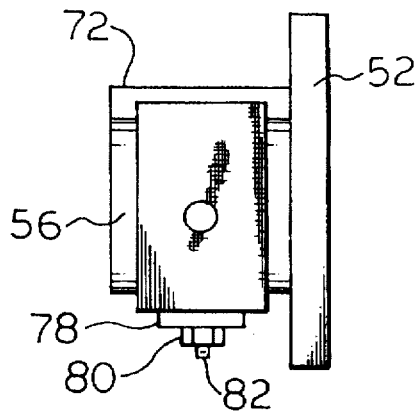
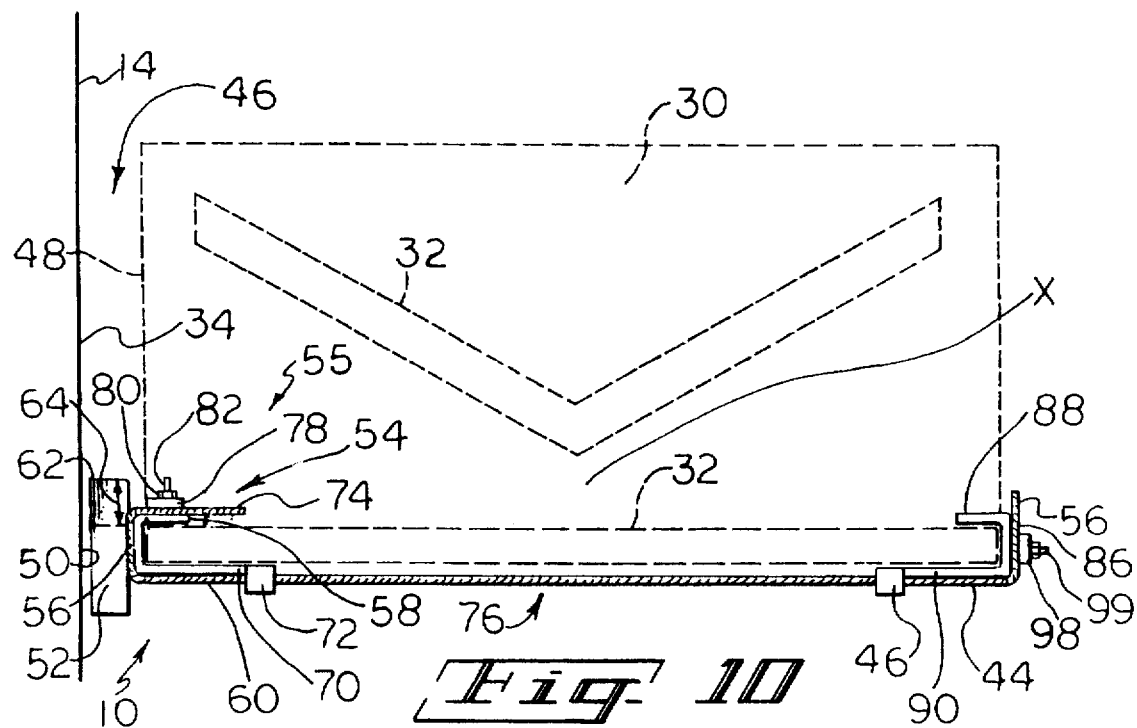

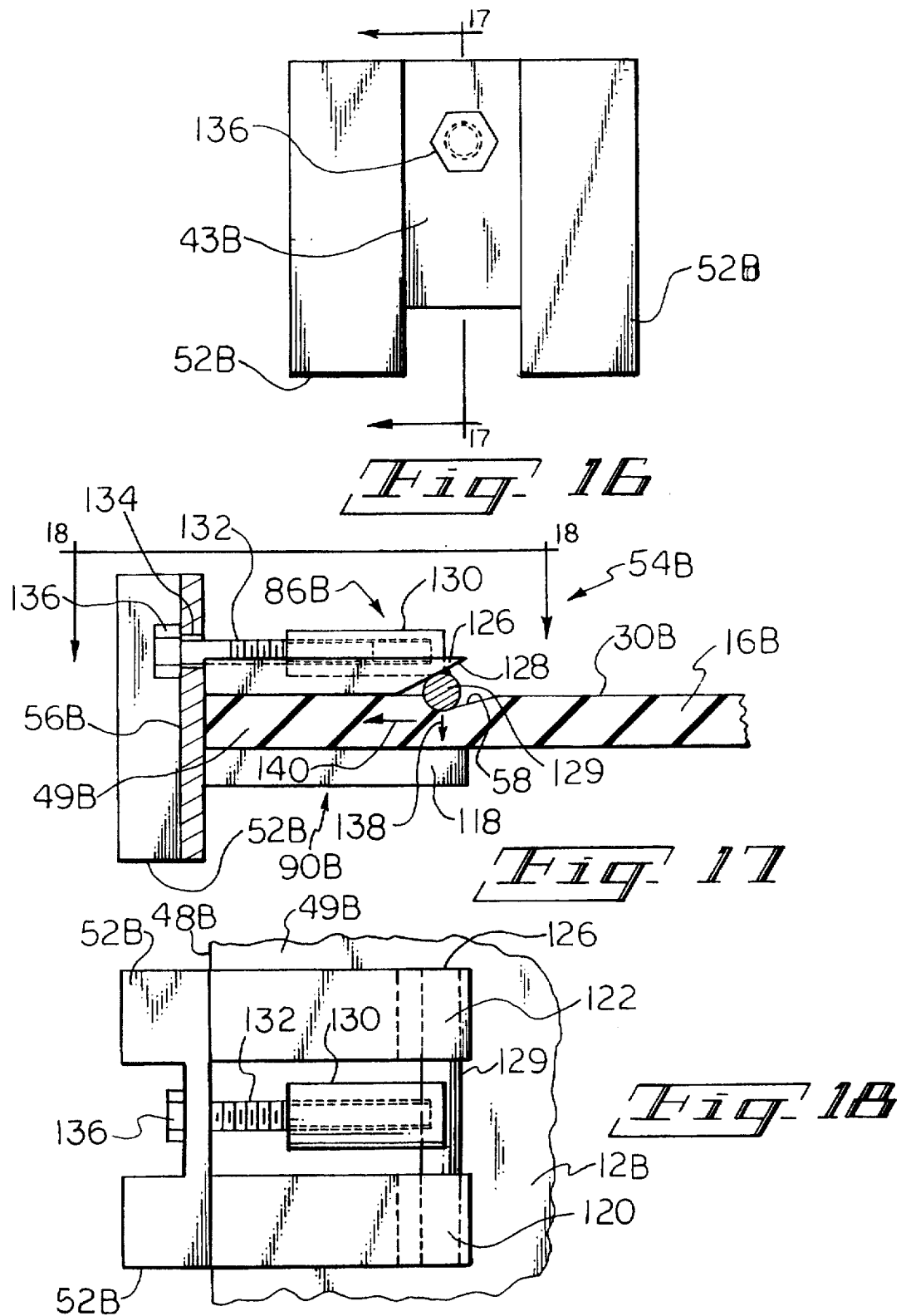

DEBRIS STRIPPING APPARATUS

BACKGROUND OF THE INVENTION

1. Field of the Invention

This invention relates to apparatus for cleaning an endless motor vehicle drive track and more particularly, to apparatus for preventing the accumulation of debris between a laterally inner edge of the track and a portion of the motor vehicle laterally adjacent the laterally inner track edge.

2. Description of the Prior Art and Objects

A track driven vehicle typically includes a pair of endless tracks mounted on opposite sides of the vehicle and trained around a plurality of drive sprocket wheels and idler sprocket wheels.

One such type of vehicle is a farm tractor implement having rubber drive tracks provided with integral rubber cleats. As the tractor negotiates the earth's surface, debris, such as dirt, mud, corn stalks and weeds, will frequently accumulate between the laterally inner edge of the track and a laterally adjacent portion of the vehicle housing and/or frame.

The corn stalks and weeds will tend to hold the dirt and mud which will continue to accumulate and compact under the compacting force of the adjacent track. This compacted debris, including the compacted mud, is very difficult to remove. In addition, the compacted material will bear against the laterally inner edge of the track to wear and decrease the life of the track. With continued use, such wearing and abrasion of the track can cause the rubber track to substantially heat and deteriorate. Additional energy is also required to propel the tractor because of this friction loss. Accordingly, it is an object of the present invention to provide apparatus for preventing the accumulation of debris between the laterally inner edge portion of the track and the laterally adjacent portion of the motor vehicle.

Various prior art track cleaning devices, such as that illustrated in U.S. Pat. No. 4,833,439 issued to James M. Collins on May 16, 1989, U.S. Pat. No. 3,924,905 issued to Verlin M. Simmons on Dec. 9, 1975, U.S. Pat. No. 4,818,040 issued to Edward J. Mezzancella et al on Apr. 4, 1989, U.S. Pat. No. 4,763,961 issued to John R. Parrott on Aug. 16, 1968, and U.S. Pat. No. 2,982,584 issued to Uemura on May 2, 1961 have been provided, however, all of these prior art devices are directed to apparatus which is mounted on the motor vehicle and/or is provided for cleaning the outside face or the inside face of the track as opposed to the lateral edge of the track. Accordingly, it is another object of the present invention to provide a new and novel debris stripper which will strip debris from a position adjacent a laterally inner edge of an endless track.

It is another object of the present invention to provide new and novel apparatus for mounting a debris stripper on a continuous track.

It is yet another object of the present invention to provide debris stripping apparatus of the type described which is mounted on the track.

It is a further object of the present invention to provide debris stripping apparatus which is mounted on a laterally inner edge portion of the track.

Another object of the present invention is to provide debris stripping apparatus which is mounted on the track via a U-shaped mount member for receiving a lateral edge portion of the track.

Still yet another object of the present invention is to provide a new and novel track cleaning apparatus of the type described including mechanism for adjusting the tension on a cable which couples a pair of U-shaped members on opposite edges of the track.

A further object of the present invention is to provide stripping apparatus of the type described which includes a U-shaped member mounted on each lateral edge of the track and a coupling strip therebetween for detachably mounting a stripper bar on one of the U-shaped members adjacent the laterally inner edge portion of the track.

A still further object of the present invention is to provide new and novel wedge mechanism for coupling a U-shaped stripper bar mounting member to a laterally inner edge portion of the track.

Yet another object of the present invention is to provide new and novel mechanism for mounting a stripper bar on a laterally inner edge track portion including a pair of U-shaped members which are mounted on opposite lateral edge portions of the track and mechanism for detachably coupling the U-shaped members including a pair of cable sections and mechanism for detachably coupling the cable sections together.

Other objects and advantages of the present invention will become apparent to those of ordinary skill in the art as the description thereof proceeds.

SUMMARY OF THE INVENTION

Apparatus for cleaning debris disposed laterally adjacent a lateral edge of a continuous motor vehicle drive track comprising: a stripper bar for stripping debris from a position adjacent a lateral edge of the continuous drive track; and mechanism for mounting the stripper bar on the track laterally adjacent the lateral track edge to scrape the debris from a position adjacent the lateral edge as the track moves in its endless path.

DESCRIPTION OF THE DRAWINGS

The invention may be more readily understood by referring to the accompanying drawings, in which:

FIG. 4 is a still further enlarged rear elevational view similar to FIG. 2;

FIG. 5 is a bottom plan view taken along the line 5—5 of FIG. 4;

FIG. 6 is a front elevational view thereof, opposite that illustrated in FIG. 4, taken along the line 6—6 of FIG. 5;

FIG. 7 is a top plan view taken along the line 7—7 of FIG. 4;

FIG. 8 is a side elevational view taken along the line 8—8 of FIG. 6 more particularly illustrating a bar for coupling a strap end;

FIG. 9 is an opposite side, view taken along the line 9—9 of FIG. 6, illustrating more particularly another bar for coupling the opposite strap end;

FIG. 10 is an enlarged sectional rear view similar to FIG. 2 but schematically illustrating the relationship between the track cleaning apparatus, the track and the adjacent portion of the track;

FIG. 16 is a side elevational view taken from the left side of FIG. 17;

FIG. 17 is a rear sectional view taken along the line 17—17 of FIG. 16;

FIG. 18 is a top plan view, taken along the line 18—18 of FIG. 17;

DESCRIPTION OF THE PREFERRED EMBODIMENT

Figure 1:
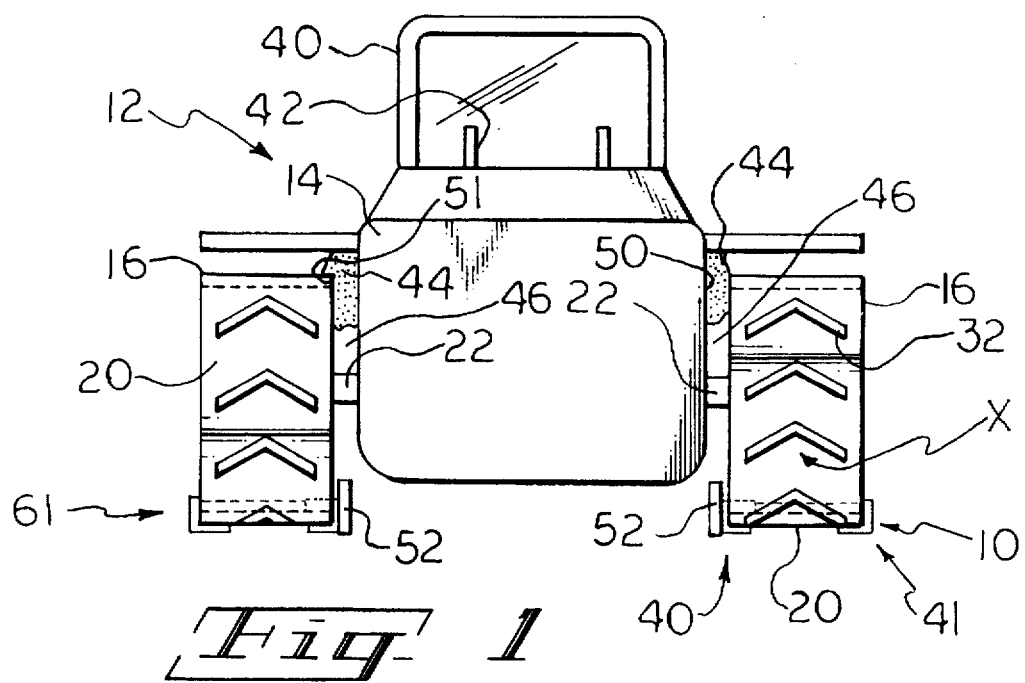
FIG. 1 is a rear elevational view illustrating a track driven motor vehicle including track cleaning apparatus, constructed according to the present invention, mounted on the lower runs of the endless tracks.
Figure 1A:
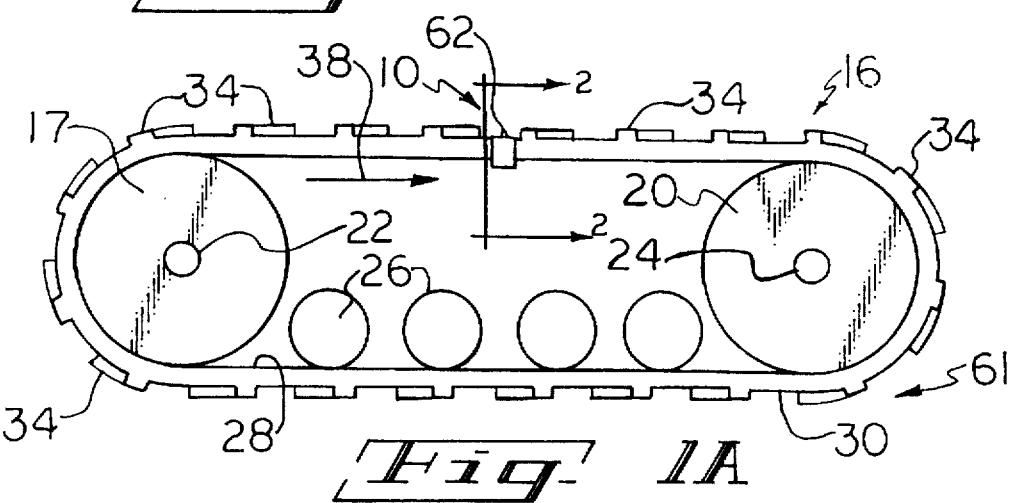
FIG. 1A is a side elevational view, taken from the right side of FIG. 1, illustrating one of the drive tracks in an adjusted position with apparatus constructed according to the present invention being mounted on the upper run of the drive track.

Apparatus, generally designated 10, constructed according to the present invention, is particularly adapted for use with a track driven vehicle, generally designated 12, including a main frame 14 and a pair of endless, continuous side drive tracks, generally designated 16, each trained around a rear drive sprocket wheel 17 and a front idler wheel 20 mounted on frame supported drive shaft 22 and idler shaft 24, respectively. A plurality of smaller diameter idler rollers, generally designated 26, engage the inside surface or face 28 of the track 16 and are mounted on the frame 14 via suitable roller supports (not shown). The track 16 includes an outer, generally horizontal surface or face 30, mounting a plurality of longitudinally spaced apart integral cleats 32 having an outer terminal, ground engaging surface 34 spaced a predetermined distance 36 from the outside track surface 30. The track 16 and lugs or U-shaped cleats 32 are integrally formed of rubber.

As the rear drive shaft 22 propels the rear drive wheel 17, the track 16 will be forwardly propelled, in the direction of the arrow 38, to forwardly move the vehicle, as usual. The main frame 14 includes a cab 40 mounting steering apparatus 42 as usual.

The structure described heretofore is entirely conventional. One problem associated with cleat driven vehicles of the type described is that debris 44, including dirt mixed with corn stalks, bean vines, weeds and the like, will inadvertently collect and compact in the gap 46 between the laterally inner track edge 48 and the laterally adjacent portion 50 of the tractor frame 14. The compacted debris 44 will bear against, and cause substantial wearing of, the laterally inner track edge 48 of laterally inner track edge portion 49. The laterally inner track edge portion 49 will substantially heat, as a result of the friction created, by the rubbing of the laterally outer edge 51 on the immediately adjacent compacted debris 44. This rubbing causes the laterally inner edge track portion 49 to substantially heat and thus degrade.

The track cleaning or stripping apparatus, generally designated 10, is provided for stripping the debris 44 disposed laterally inwardly adjacent the laterally inner track edge 48 and cleaning the track of such debris material to eliminate the heating of the track and reduce the energy otherwise required to drive the vehicle 12. The track stripping device 10 includes a vertical stripper bar 52 which is disposed in the gap 46 laterally inwardly adjacent the laterally inner track edge 48.

Stripper bar mounting apparatus, generally designated 54, is provided and includes a first, generally U-shaped mounted link, generally designated 55, having a vertical base, generally designated 56, mounting a relatively short outer leg 58 which bears against outside track surface 30 and a relatively longer, inner leg 60 for bearing against the inside track surface 28. The legs 58 and 60 snugly received the track edge portion 49 to sandwich the laterally inner edge portion 49 therebetween. The vertical stripper bar 52 is made of material, such as metal, which is substantially harder than the rubber material comprising the track 16. The stripper bar 52 is welded, or integrally formed with, to the base member 56 and includes an outer terminal end 62 which terminates a distance 64 outwardly of the outside track surface 30 which is less than the cleat height 36 so as not to engage the earth's surface along the lower run 61 of the track 16.

The terminal end 70 of the inner longer leg 60 includes an integrally formed, belt receiving loop 72 through which one end 74 of a flexible, flaccid strip 76 is threaded. The strap end 74, after passing around the base 56, is coupled to the outer shorter leg 58 via a clamp bar 78 and nut 80 threaded onto a vertical bolt stem 82 welded or otherwise suitably fixed to the short leg 58.

The stripper bar mounting apparatus 54 also includes a second U-shaped mounting link or anchor 85, which is substantially identical to the link 55, and includes a base 86 mounting a relatively short outer leg 88 and a longer inner leg 90 having a terminal end 91 mounting a belt loop 92 through which the opposite belt end 94 is threaded. The legs 88 and 90 sandwich the laterally outer track edge portion 53 therebetween. The terminal belt end 94 is fixed to the base 86 via a clamp bar 98 received on a pair of bolts 99 which are welded to base 86. The clamp bar is held thereon via a pair of nuts 97.

The flaccid strap 76 is disposed in the gap X between adjacent selected adjacent ones of the track lugs or cleats 32.

THE OPERATION

Figure 2:
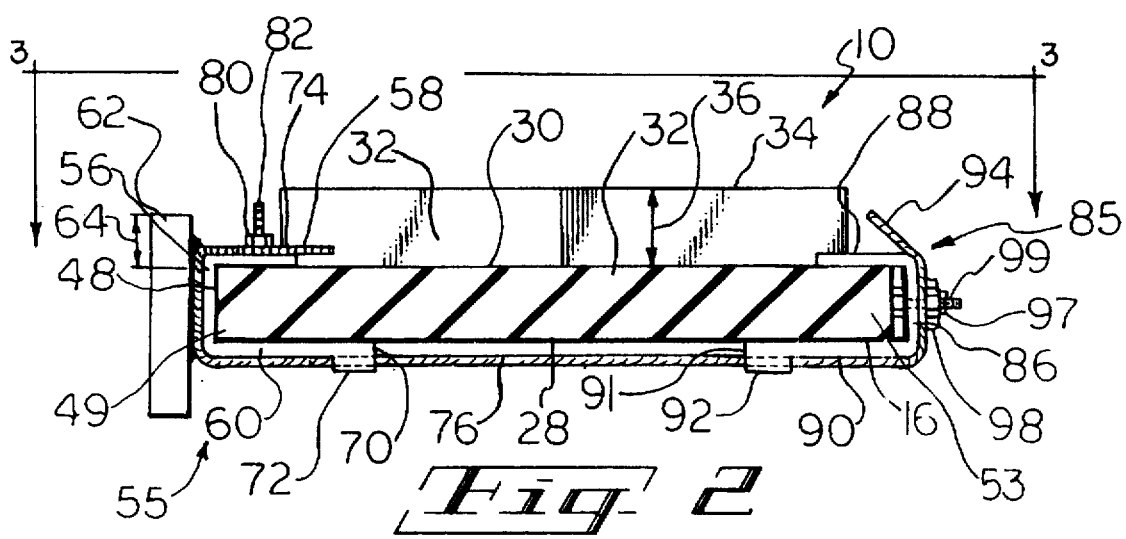
FIG. 2 is an enlarged sectional rear view taken along the line 2—2 of FIG. 1A
Figure 3:
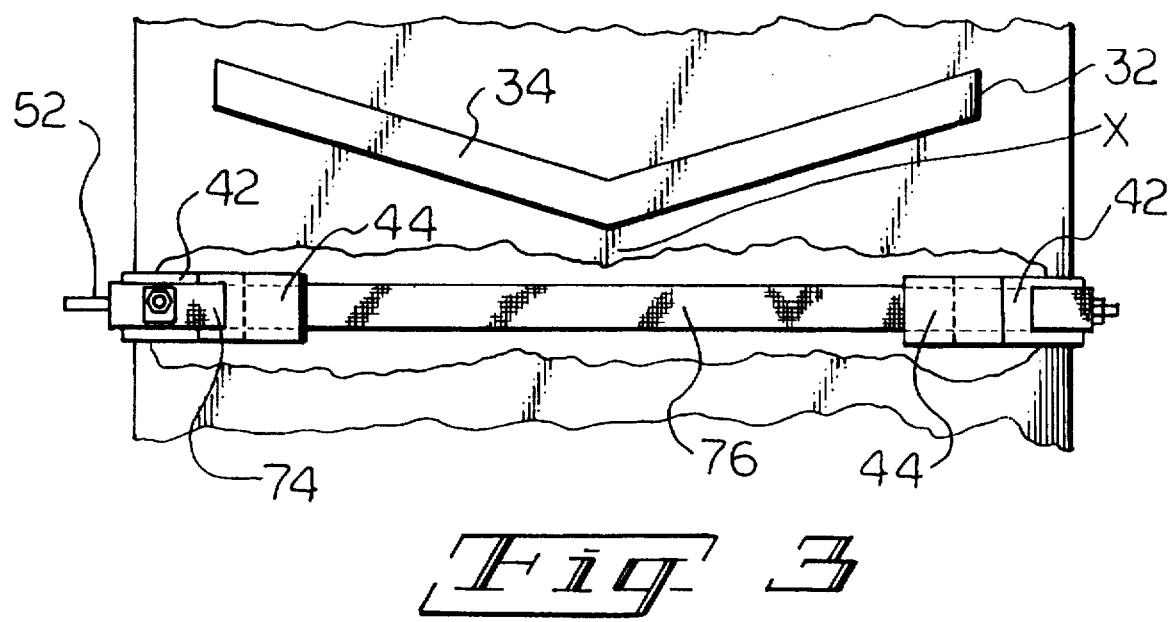
FIG. 3 is a further enlarged top plan view taken along the line 3—3 of FIG. 2.
Figure 11:
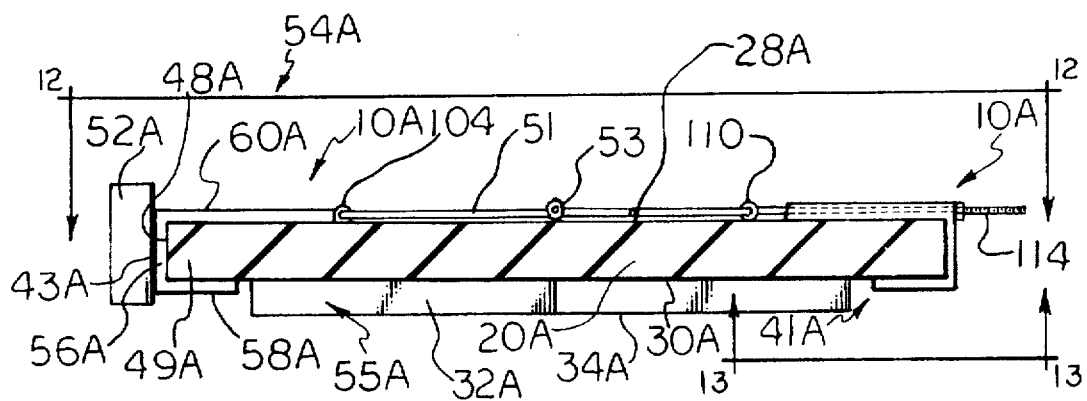
FIG. 11 is a rear elevational view similar to FIG. 2, illustrating track cleaning apparatus, constructed according to a slightly modified embodiment, mounted along a lower run of the continuous track.
Figure 12:
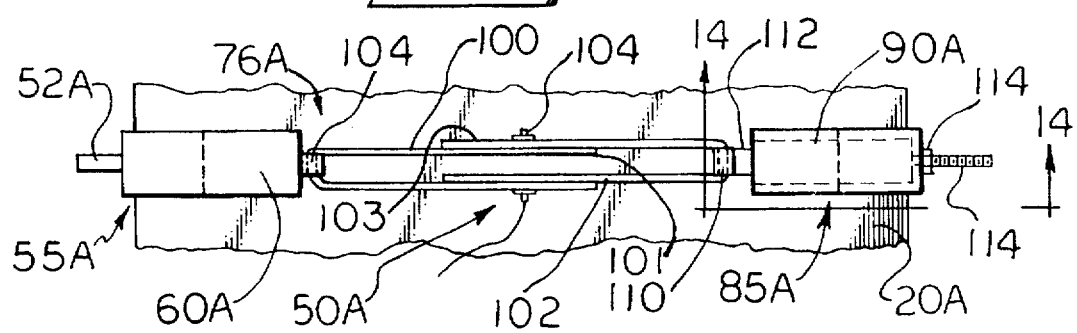
FIG. 12 is a top plan view, taken along the line 12—12 of FIG. 11.
Figure 13:
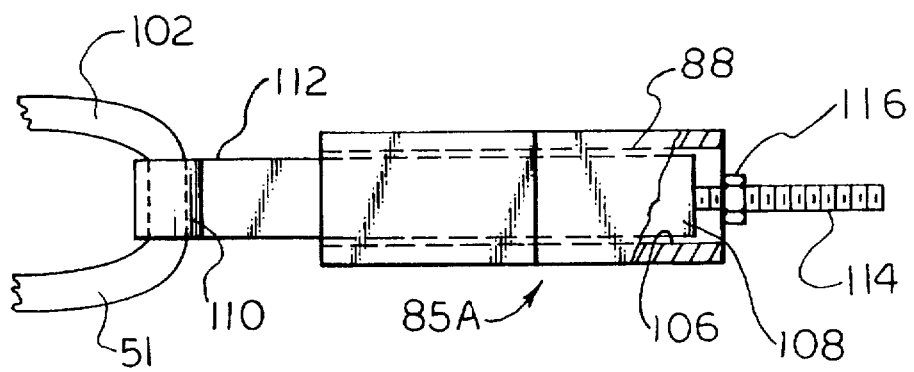
FIG. 13 is a further enlarged bottom plan view taken along the lines 13—13 of FIG. 11.
Figure 14:
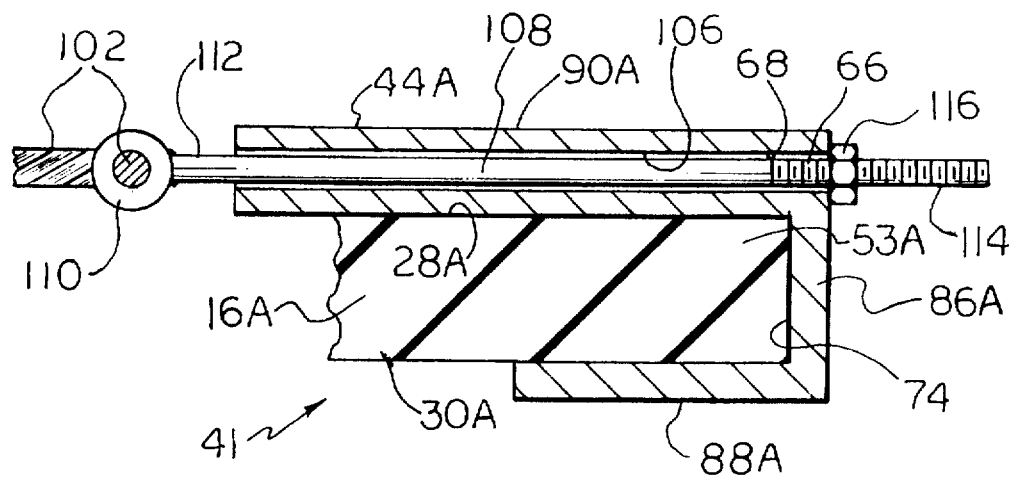
FIG. 14 is a still further enlarged rear sectional view, taken along the section line 14—14 of FIG. 12.
Figure 15:
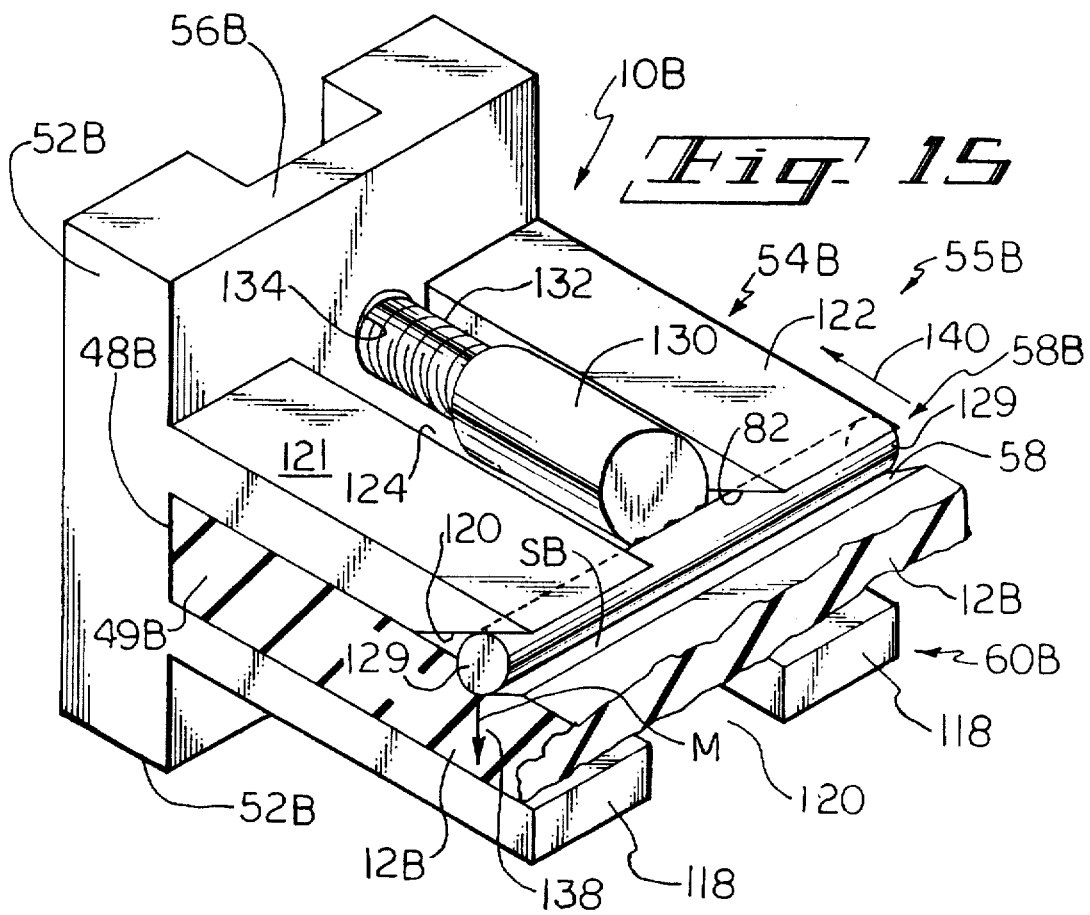
FIG. 15 is an enlarged perspective view illustrating track cleaning apparatus constructed according to another slightly modified embodiment.
Figure 19:
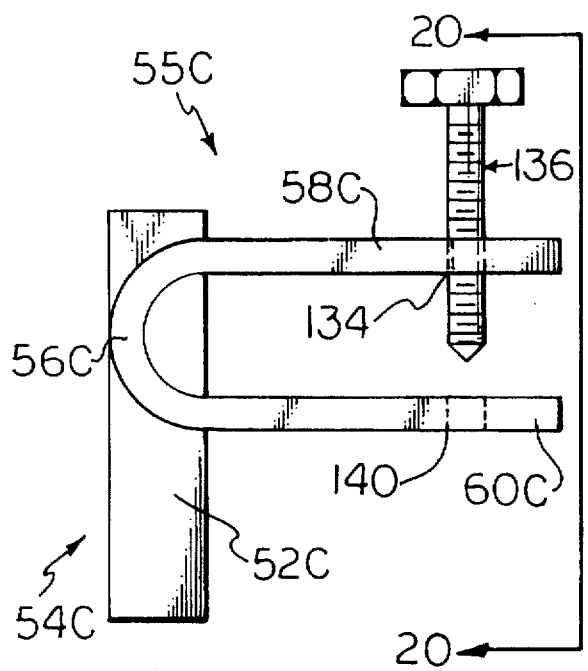
FIG. 19 is a rear elevational view track cleaning apparatus constructed according to a further slightly modified embodiment.
Figure 20:
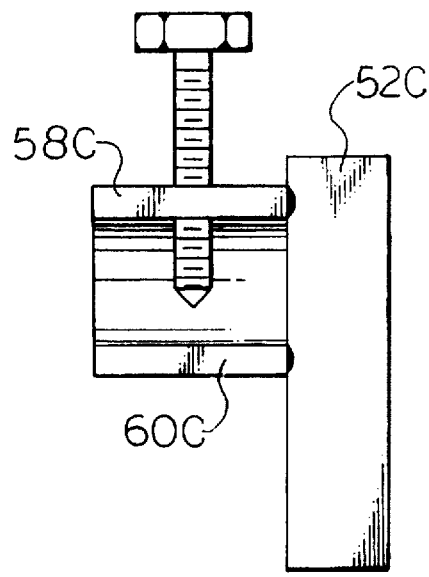
FIG. 20 is a side elevational view thereof, taken along the line 20—20 of FIG. 19.
Figure 21:
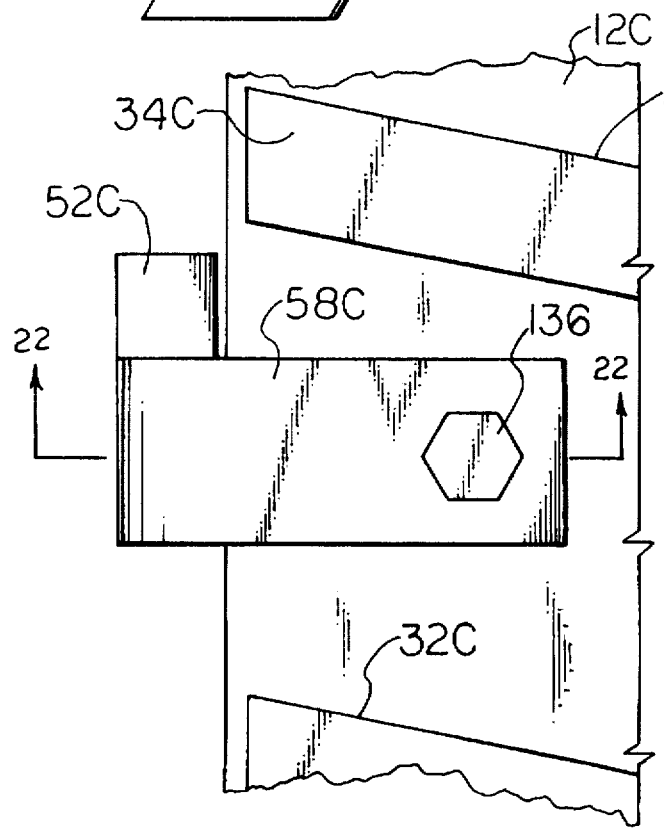
FIG. 21 is a top plan view thereof, illustrating the debris cleaning apparatus mounted on a drive track.

Prior to driving the track driven vehicle 12 into a field laden with debris, one or more of track strippers, generally designated 10, is mounted on each of the tracks 16 in the positions illustrated in FIG. 2.

To mount the track cleaner, the U-shaped clamp 85 is decoupled from the strap 76 and mounted on the laterally outer track edge portion 53, in the position illustrated in FIG. 2. Toward this end, the outer nuts 97 on the laterally outer bolts 99 are initially unthreaded so that the terminal belt end 94 of coupling strap 76 can be withdrawn from the loop 92 and allow the first U-shaped member mounting link 55 to be moved independently of the second U-shaped link 85. The first U-shaped mounting link 55, including the stripper bar 52, is mounted on the laterally inner track edge portion 49 in the position illustrated in FIG. 2. The terminal strap end 94 of belt 76 is then rethreaded through the loop 92 and recoupled to the base 86 of the second U-shaped member 55 mounted on the outer track edge portion 53 via the nuts 97 and clamp bar 98.

As the rear drive wheel 17 propels the track 16 in direction of the arrow 38, the stripper bar 52 will engage and remove the compacted material 44 immediately laterally inwardly adjacent to the track edge 48 so that the track edge 48 remains clear of debris.

ALTERNATE EMBODIMENT

Referring now more particularly to FIGS. 11–14, a slightly modified track cleaner 10A is illustrated and generally similar parts will be referred to by generally similar reference characters followed by the letter A subscript.

As opposed to the coupling strip 76, a cable connector, generally designated 76A, is provided for coupling the U-shaped links 55A and 85A. The cable connector 76A includes cable half segments 100 and 102 having their confronting ends 101 and 103, respectively, detachably coupled together via clamps 104. The cable half 100 is slidably received in a hollow cable loop or cylinder 104 fixed to the terminal end of inner leg 60A.

The longer inner leg 90A of the second U-shaped mounting link 85A is hollow and includes a passage 106 which slidably receives a flat bar 108 that has a hollow cable loop or cylinder 110 at its terminal end 112 which slidably receives the cable half 102. A threaded bolt 114 is fixed to the flat bar 108 and is longitudinally moveable via a nut 116, threaded on the bolt 114 bearing against leg 90A to adjust the tension on the cable 102.

The U-shaped mounting members 55A and 85A are easily adjusted to accommodate tracks 12 of different widths by merely utilizing cable half segments 100 and 102 of different lengths.

SECOND ALTERNATE EMBODIMENT

Referring now more particularly to FIGS. 15–18, a further slightly modified track cleaner 10B is illustrated and generally similar parts will be referred to by generally similar reference characters followed by the letter B subscript.

The track cleaner 10B includes a stripper bar 52B integral with the base 56B and mounted on the laterally inner track edge portion 49B via stripper bat mounting apparatus 54B which includes only one U-shaped member 55B instead of two U-shaped members as disclosed in the two previously described embodiments.

The longer inner leg, generally designated 60B, of U-shaped mounting member 55B differs from the legs 60 and 60A, in that the leg 60B is bifurcated and includes a pair of spaced apart bars 118 separated by a gap 120. The relatively shorter outer legs 58B differs from the leg 58 and 58A in that the leg 58B includes a pair of bifurcated bars or fingers 121 and 122 separated by a gap 124. Moreover, the terminal ends 126 of the inside fingers 120 and 122 include a cam or wedge surfaces 128 which are inclined downwardly and laterally inwardly toward the longer inner leg 90B.

The stripper bar mounting apparatus 54B includes a clamping rod or bar 129, welded or otherwise suitably fixed to a threaded cylinder 130 into which is threaded a bolt 132 received an aperture 134 extending through the base 56B. The bolt 134 includes a bolt head 136 for engagement by a suitable wrench for threading into and out of the cylinder 130 to laterally move the clamping or wedge bar 128 laterally inwardly against the cam surfaces 128 which forces the clamping bar 129 vertically downwardly in the direction of the arrow 138 as it is moving laterally inwardly in the direction of the arrow 140.

As the bolt 132 is threaded into the cylinder 130, the clamping bar 129 will grip the outside surface or face 30B of the track 12B forcing the U-shaped member 55B laterally toward the track 16B to depress a track portion 58.

THIRD ALTERNATE EMBODIMENT

Track cleaning apparatus 10C, constructed according to the slightly further modified embodiments, is illustrated in FIGS. 19–22 and generally similar portions will be referred to by generally similar reference characters followed by the letter C subscript. The track cleaner 10C includes a stripper bar 52C integrally welded to the base 56C and mounted on the laterally inner track edge portion 49C via stripper bar mounting apparatus, generally designated 54C, which also includes only one U-shaped member 55C instead of two U-shaped members as disclosed in the first two embodiments described above.

Figure 22:
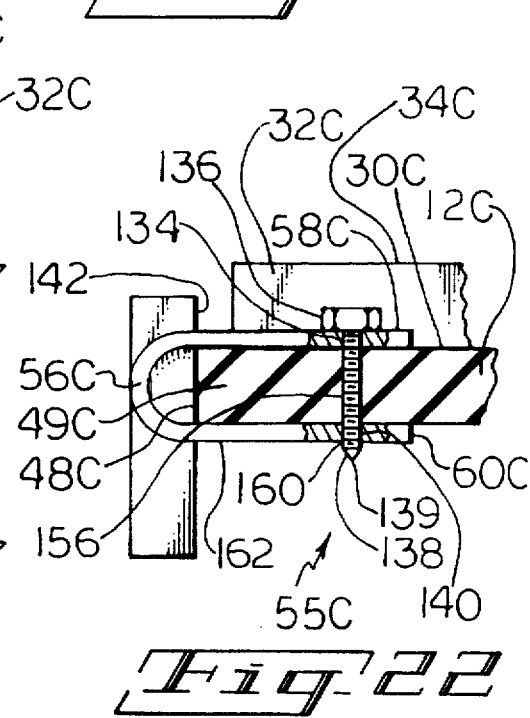
FIG. 22 is a rear sectional view, taken along the line 22—22 of FIG. 21.

In this embodiment, the inner leg 58C and outer leg 60C are of the same length. The inner leg 58C bears against the inner track surface 30C of track 12C and includes a threaded aperture 134 which threadedly receives a threaded bolt 136 having a sharpened end 138 terminating in a sharp, track piercing point 139. The outer leg 60C includes a non-threaded aperture 140 for receiving the pointed end 138 after the bolt forcibly penetrates through the track 12C. As illustrated in FIG. 22, the laterally inner edge 142 of the stripper bar 52C will abut the outer adjacent track edge 48C.

The apparatus 54C is slipped over the inner track edge 49C while the bolt 136 is completely removed from the apertures 140 and 134. After the leg 58C and 60C are in the positions illustrated in FIG. 22, the bolt 136 is threaded into the threaded recess 134 to forcibly pierce an aperture 156 in the track 12C until the bolt passes through the aperture 140 in the leg 60C to the position illustrated in FIG. 22. The bolt 136 will hold the device 54C in position. If desired, a second bolt 136 could be installed through another threaded bore (not shown) identical to the threaded bore 140. If desired, the bolt hole 140 could be threaded and, if necessary, the bolt 136 can be made sufficiently long to receive a nut (not shown) which would be threaded onto the bolt 136 to hold it in position.

It is also possible, once the device is installed as illustrated in FIG. 24, that the terminal end could be severed along the line 160 flush with the face 162 of the legs 60C. If the terminal end was cut off along the line 160, after the bolt 136 was removed, a substitute bolt would have to be utilized to penetrate the track 12C when the device was reinstalled.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I is claim:

1. Debris stripping apparatus for preventing the accumulation of debris between a track driven motor vehicle and a continuous, motor vehicle drive track having a laterally inner track edge portion adjacent said motor vehicle, a laterally outer track edge portion remote from said motor vehicle, an inside track face extending horizontally between said laterally inner and outer edge portions;

an outside track face, extending between said laterally inner and outer edges portions for engaging the earth surface to be traversed;

said debris stripping apparatus comprising:

upstanding stripper bar means, adapted to be mounted adjacent said laterally inner edge portion, for stripping debris which might inadvertently accumulate between said laterally inner edge portion and said motor vehicle;

mounting means, comprising a U-shaped member, for mounting said stripper bar means on said laterally inner edge portion of said track; and securing means for detachably securing said U-shaped member to said laterally inner edge portion of said track.

2. The debris stripping apparatus set forth in claim 1 wherein said U-shaped member includes a base for extending vertically along said laterally inner track edge portion;

an inside leg for extending along said inside track face; and an outside leg for extending along said outside track face.

3. The debris stripping apparatus set forth in claim 2 wherein said securing means includes anchor means mounted on said laterally outer track edge portion, and coupling means for detachably coupling said U-shaped member to said anchor means.

4. The debris stripping apparatus set forth in claim 3 wherein said anchor means comprises a second U-shaped member.

5. The debris stripping apparatus set forth in claim 4 wherein said first mentioned U-shaped member and said second U-shaped member are identical.

6. The debris stripping apparatus set forth in claim 3 wherein said coupling means comprises a strip of flexible material for extending along said inside track face, coupling said inside leg to said anchor means.

7. The debris stripping apparatus set forth in claim 6 including means for detachably coupling said strip of flexible material to said anchor means.

8. The debris stripping apparatus set forth in claim 7 wherein said anchor means comprises a second U-shaped member having a base for extending vertically along said laterally outer edge of said track and inside and outside legs mounted on said base for extending along said inside and outside track faces, respectively of said track; said strip being coupled to said inside legs of said first mentioned U-shaped member and said second U-shaped member.

9. The debris stripping apparatus set forth in claim 8 wherein said strip comprises a flaccid strap.

10. The debris stripping apparatus set forth in claim 8 wherein said strip comprises a cable.

11. The debris stripping apparatus set forth in claim 10 wherein said cable comprises a first cable line coupled to said inside leg of said first mentioned U-shaped member, a second cable line coupled to said inside leg of said second U-shaped member, and means detachably coupling said first and second cable lines together.

12. The debris stripping apparatus set forth in claim 8 including tension adjustment means on said second U-shaped member for selectively adjusting the tension on said strip of flexible material.

13. The debris stripping apparatus set forth in claim 12 wherein said tension adjusting means is mounted on said inside leg of one of said U-shaped member and said second U-shaped member.

14. The debris stripping apparatus set forth in claim 13 wherein said inside leg of said second U-shaped member includes a passage therethrough; said tension adjusting means comprises screw means coupled to said strip and extending through said passage.

15. The debris stripping apparatus set forth in claim 2 wherein said securing means comprises wedge means horizontally and vertically moveable from a remote position to a laterally inward wedging position between said legs for wedging against one of said inside and outside surfaces of said track.

16. The debris striping apparatus set forth in claim 15 wherein said inside leg includes a terminal end having a tapered cam surface inclined laterally inwardly in a direction toward said outside leg.

17. The debris stripping apparatus set forth in claim 16 wherein said wedge means includes a wedge surface for bearing against said cam surface for vertically moving said wedge means toward said outside leg and said track as said wedge means is moved in a direction laterally inwardly from said remote position to said laterally inward wedging position.

18. The debris stripping apparatus set forth in claim 2 wherein said inside leg includes a pair of generally horizontal, spaced apart bars separated by a gap.

19. The debris stripping apparatus set forth in claim 18 including means disposed in said gap for moving said wedge means between said remote position and said laterally inward wedging position.

20. The debris stripping apparatus set forth in claim 18 including an aperture in said base and threaded means receiving in said aperture, disposed in said gap, and coupled to said wedge means for moving said wedge means horizontally in a laterally inward direction toward said cam surface on said inside leg to force said wedge means vertically toward said outside leg and a portion of said track disposed adjacent said cam surface of inside leg.

21. The debris stripping apparatus set forth in claim 2 wherein said upstanding stripper bar means is mounted on said base.

22. The debris stripping apparatus set forth in claim 2 wherein said securing means comprises means mounted on one of said legs for penetrating said track.

23. The debris stripping apparatus set forth in claim 22 wherein said one of said legs includes a threaded bore therethrough and said securing means comprises a track piercing member threadedly received by said threaded bore for movement between a remote position removed from said track and a track penetrating position.

24. The debris stripping apparatus set forth in claim 23 wherein said track piercing member includes a track piercing terminal end sharpened to a conical point.

25. The debris stripping apparatus set forth in claim 24 wherein the other of said legs includes a threaded bore for receiving said terminal end of said track piercing member.

26. Debris stripping apparatus for preventing the accumulation of debris between a track driven motor vehicle and a continuous, motor vehicle drive track having a laterally inner track edge portion adjacent said motor vehicle, a laterally outer track edge portion remote from said motor vehicle, an inside track face extending horizontally between said laterally inner and outer edge portions;

an outside track face, extending between said laterally inner and outer edges portions for engaging the earth surface to be traversed; and a plurality of lugs mounted on, and projecting a predetermined distance outwardly from said outside track face;

said debris stripping apparatus comprising:

upstanding stripper bar means, adapted to be mounted adjacent said laterally inner edge portion, for stripping debris which might inadvertently accumulate between said laterally inner edge portion and said motor vehicle;

a plurality of lugs mounted on, and projecting a predetermined distance outwardly from, said outside surface;

said stripper bar means projecting outwardly and including an outer terminal end terminating a lesser predetermined distance from said outside track face; and mounting means for mounting said stripper bar means on said laterally inner edge portion of said track.

27. The debris stripping apparatus set forth in claim 26 wherein said track and lugs are integrally formed of rubber having a predetermined hardness and said stripper bar means comprises metal having a substantially greater hardness than said predetermined hardness.

28. Debris stripping apparatus for preventing the accumulation of debris between a track driven motor vehicle and a continuous, motor vehicle drive track having a laterally inner track edge portion adjacent said motor vehicle, a laterally outer track edge portion remote from said motor vehicle, an inside track face extending horizontally between said laterally inner and outer edge portions;

an outside track face, extending between said laterally inner and outer edges portions for engaging the earth surface to be traversed; and a plurality of lugs mounted on, and projecting a predetermined distance outwardly from said outside track face;

said debris stripping apparatus comprising:

upstanding stripper bar means, adapted to be mounted laterally inwardly adjacent said laterally inner edge portion, for stripping debris which might inadvertently accumulate between said laterally inner edge portion and said motor vehicle; and mounting means for mounting said stripper bar means on said laterally inner edge portion of said track in a position laterally inwardly adjacent said laterally inner edge portion.

29. Apparatus for cleaning debris disposed laterally inwardly adjacent a laterally inner edge of a continuous motor vehicle, drive track moving in an endless path and including laterally spaced apart, laterally inner and outer edges, said apparatus comprising:

stripper bar means for stripping debris from a position laterally inwardly adjacent a laterally inner edge of a continuous motor vehicle drive track moving in an endless path; and mounting means for mounting said stripper bar means on said track in an upstanding position laterally inwardly adjacent said laterally inner edge to scrape said debris from a position laterally inwardly adjacent said laterally inner edge as said track moves in said endless path.

30. The apparatus set forth in claim 29 wherein said mounting means includes a U-shaped member having a base and a pair of spaced apart legs defining an opening therebetween for receiving a portion of said track adjacent said laterally inner edge, and means detachably securing said U-shaped member to said track.

31. The apparatus set forth in claim 30 wherein said stripper bar means is mounted on said base.

32. Track cleaning apparatus for cleaning debris from a position laterally inwardly adjacent a laterally inner edge of a continuous, motor vehicle drive track having laterally inner and outer edges, said apparatus comprising:

stripper means for stripping debris from a position laterally inwardly adjacent a laterally inner edge of a continuous motor vehicle drive track; and U-shaped mount means for receiving a portion of said track laterally outwardly adjacent said laterally inner edge and mounting said stripper means laterally inwardly adjacent said laterally inner edge.

* * * * *